Oct. 7, 1930.  A. D. KUMPF  1,777,728
MECHANISM FOR CRIMPING LEADER PIPE
Filed Feb. 25, 1928  3 Sheets-Sheet 1

WITNESS:

INVENTOR
August D. Kumpf
BY
ATTORNEYS.

Oct. 7, 1930.  A. D. KUMPF  1,777,728
MECHANISM FOR CRIMPING LEADER PIPE
Filed Feb. 25, 1928  3 Sheets-Sheet 2

WITNESS:
Robt R Mitchell

INVENTOR
August D. Kumpf
BY
Busser & Harding
ATTORNEYS.

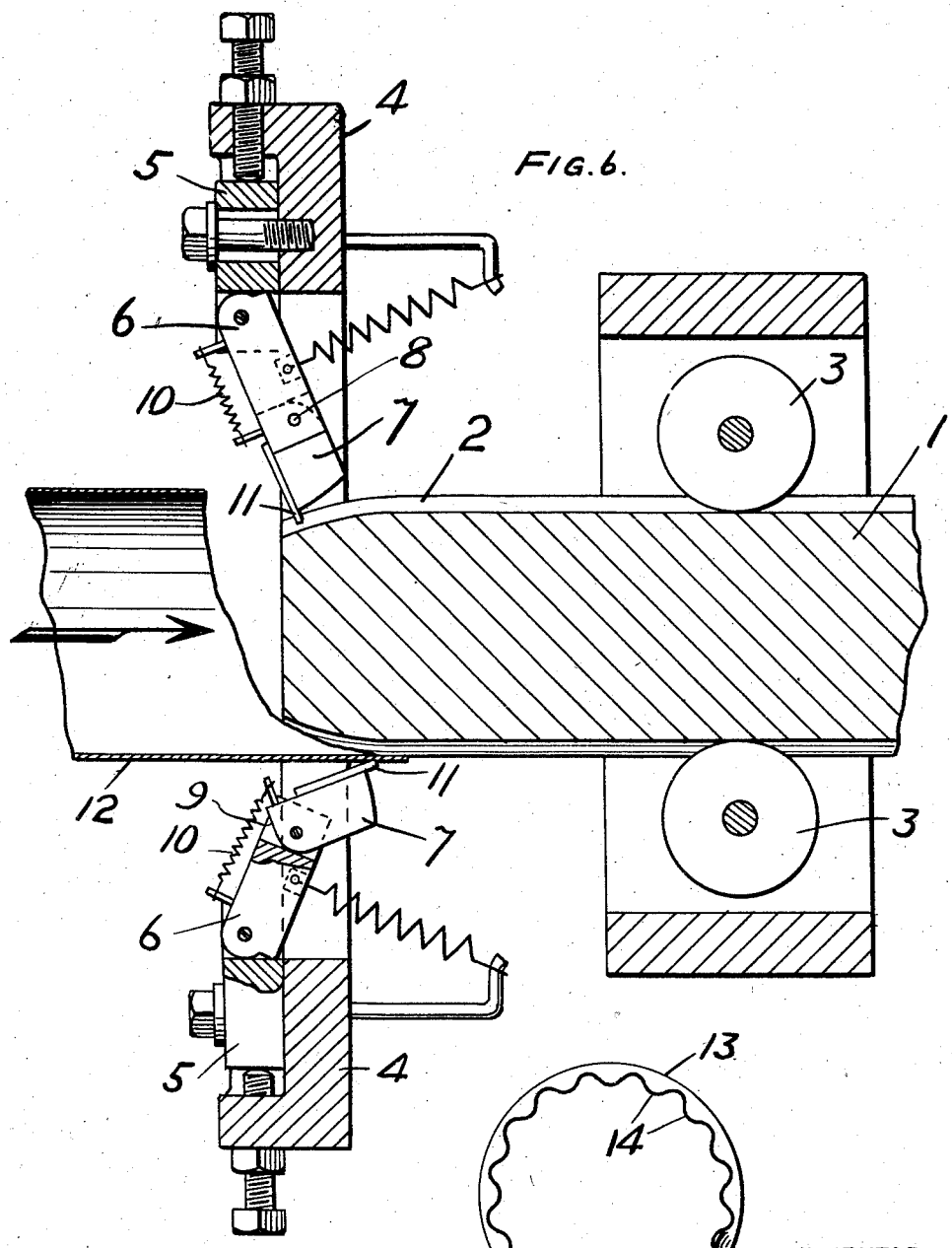

Patented Oct. 7, 1930

1,777,728

UNITED STATES PATENT OFFICE

AUGUST D. KUMPF, OF PHILADELPHIA, PENNSYLVANIA, ASSIGNOR TO BERGER BROTHERS COMPANY, OF PHILADELPHIA, PENNSYLVANIA, A CORPORATION OF PENNSYLVANIA

MECHANISM FOR CRIMPING LEADER PIPE

Application filed February 25, 1928. Serial No. 256,950.

My invention relates to an improvement in mechanism for crimping leader pipe.

As is well known, leader pipe used for draining roof gutters is customarily formed in sections from sheet metal, as galvanized iron, tin, copper and the like, and is produced in various shapes such as round and quadrilateral and either plain or fluted. The sections of leader pipe are in use assembled together by telescoping the end of one section into an end of an adjacent section and to facilitate the assembly the sections are crimped or reduced at one end.

Heretofore leader pipe has been crimped after the sections are produced by the insertion of an end of each section into a crimping device followed by withdrawal after crimping. Such crimping devices are separate and apart from the mechanism used for forming the sections and the crimping operation has required an extra operation involving extra handling of the sections and considerable space to enable the sections to be maneuvered into and out of the crimping device after withdrawal from the forming mechanism.

An object of the present invention is the provision of an improved crimping mechanism for uniformly crimping the ends of sections of pipe of the character described. A further object is the provision of such mechanism which may be combined with a fluting mechanism or mechanism for forming the pipe from sheet metal whereby economy of labor and space is obtained.

Further objects and advantages will be apparent upon consideration of the following description with reference to the accompanying drawings in which:

Fig. 6 is a sectional view illustrating a modified embodiment of my invention; and Fig. 7 is an end view of the crimped end of a plain round pipe formed by the improved mechanism.

Figure 1:
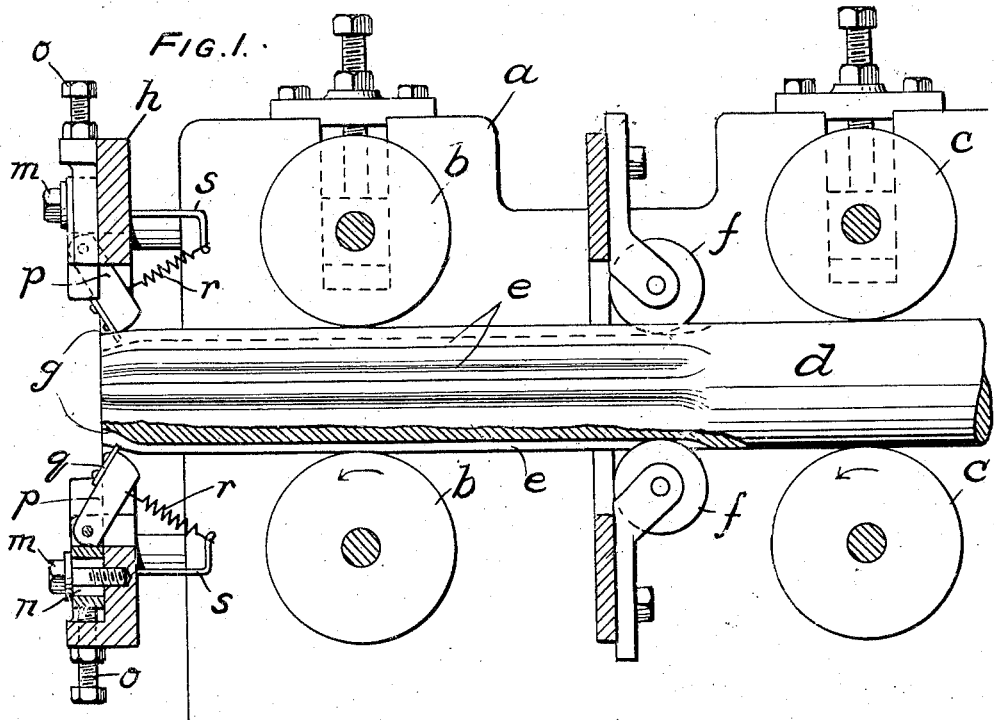
Fig. 1 is a sectional view of a portion of a leader pipe forming machine embodying my invention.
Figure 2:
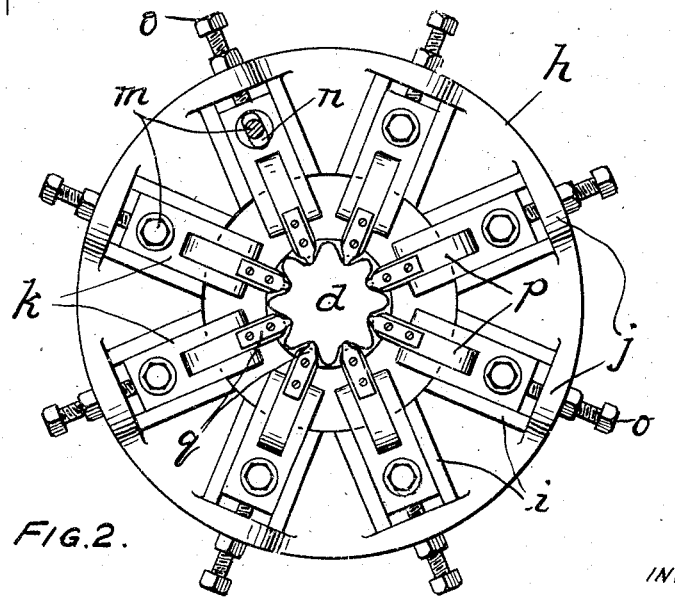
Fig. 2 is a front view of the crimping mechanism.

Referring more particularly to Figs. 1-4, $a$ indicates the frame of a leader pipe forming machine involving the usual devices for forming and seaming sheet material and including pairs of feed rolls $b$, $b$ and $c$, $c$, the upper roll of each pair being adjustable and the lower roll of each pair being suitably driven, a die or mandrel $d$ fluted for a distance from its end as indicated at $e$, Fig. 1, and a plurality of fluting rolls $f$, $f$, adapted to cooperate with the die $d$ to effect fluting of the leader pipe after its formation, are provided. The end of the die $d$ is beveled off as shown at $g$, Figs. 1 and 3.

Figures 3, 4, 5:
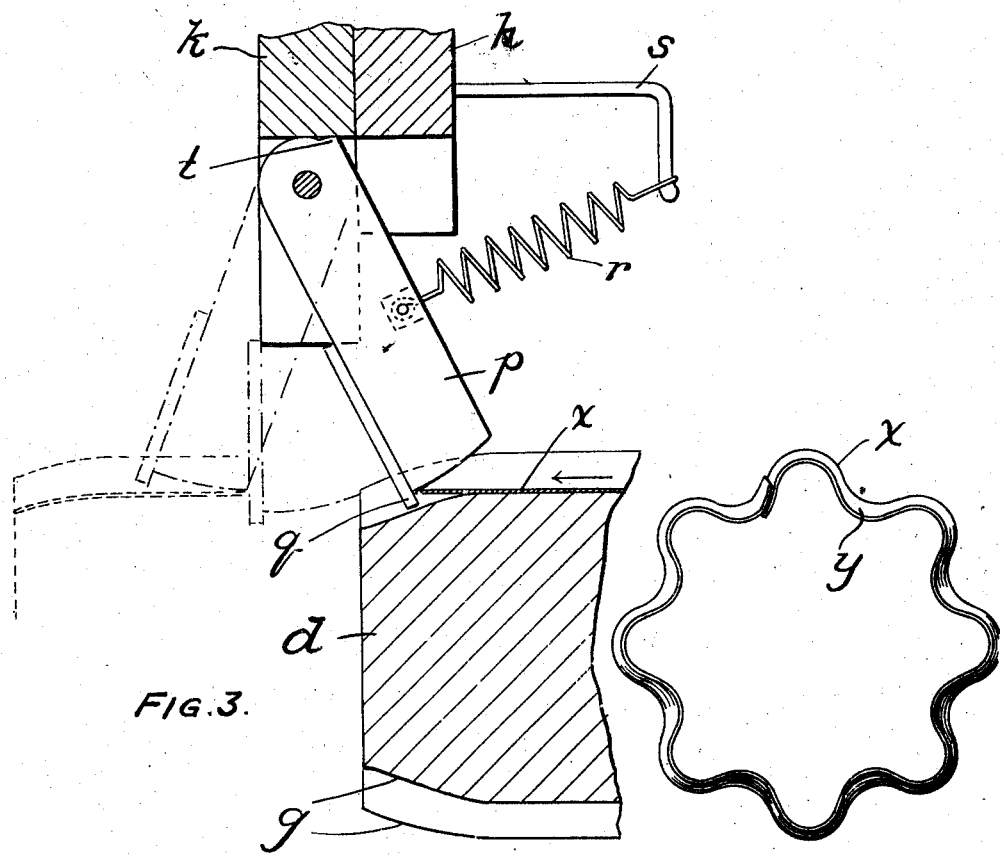
Fig. 3 is an enlarged sectional view of a detail of construction.
Fig. 4 is an end view of a section of leader pipe.
Fig. 5 is a diagrammatic view of a modified form of crimping mechanism embodying my invention.

Surrounding the end of die $d$ is a ring-like frame $h$ suitably supported from the frame $a$ and which is provided with radial guides $i$ at the outer ends of which are formed bosses $j$. Within the radial guides $i$ are positioned blocks $k$ bifurcated at their inner ends and adapted to be adjustably secured to the frame $h$ by means of bolts $m$ passed through slots $n$ in the blocks and threaded into the frame $h$. For adjustment, bolts $o$ are threaded through the bosses $j$ and bear against the outer ends of the blocks $k$. Within the bifurcated end of each of the blocks $k$ a finger $p$ is secured at one end by means of a pivot. The free end of each of the fingers $p$ extends beyond the end of the block to which it is attached and is desirably beveled from the rear to the front, as shown in Fig. 3. Secured to the forward faces of the fingers $p$ are members $q$ which extend slightly beyond the free ends of the fingers, and springs $r$ connected to the fingers and to brackets $s$, extending from frame $h$, act to hold the fingers in retracted position fixed by the engagement of stops $t$ on the upper ends of the fingers with the blocks $k$, as shown in Fig. 3.

In operation, the leader pipe $x$ is formed by the usual devices, not shown, and the formed pipe is advanced on die *d* by feed rolls *c*. In the advance of the pipe it is acted on by the fluting rolls *f* and passes into the control of feed rolls *b*. As the end of the pipe is advanced, it strikes the members *q*, carried by fingers *p* (see Fig. 3), and in the continued advance of the pipe the fingers are caused to swing on an arc so that their ends bear down on and crimp the end portion of the pipe, as shown at *y* Fig. 4, the crimping being permitted by the fact that the end of the die *d* is beveled off as at *g*. When the fingers pass over their centers they lie against the pipe until, on withdrawal of a completed section from the machine, they are drawn back into retracted position by the springs *r*, for the crimping of a following section.

Referring now to Fig. 5, in which a modification of my invention is shown diagrammatically, it will be noted that the fingers *p'*, which are supported and operate as do the fingers *p*, are variously positioned to crimp a leader pipe quadrilateral in cross-section, in that fingers are provided for the corners and sides of the pipe.

In the modification shown in Figs. 1 to 4, the pipe is formed and fed off the die. It may be desirable, however, to crimp the ends of preformed pipe sections, using the crimping means disclosed which produces a uniform crimped end in a simple manner. A modified arrangement suitable for this operation is shown in Fig. 6 in which 1 indicates a die or mandrel suitably supported at its rear end. Grooves 2 may be provided longitudinally of the die if it is desired to form or crimp corrugated pipe. If it is desired to crimp circular pipe, these grooves may, of course, be eliminated although if present they would do no harm. In crimping corrugated pipe, irrespective of whether the pipe is or is not corrugated in the same operation, rollers 3 entering the grooves may be provided. Feed rolls, not shown in Fig. 6, similar to rolls *b* and *c* may be provided.

Mounted in a frame 4 corresponding to frame *h* there are a plurality of blocks 5 carrying fingers. In this case, instead of the fingers being integral, they are formed of two parts 6 and 7 pivoted as at 8 to each other. The outer part 6 of each finger is pivoted to the block and provided with a stop corresponding to stop *t* to limit its spring-urged inward movement. A spring 10 normally keeps parts 6 and 7 in alinement by engagement of a stop face 9 of 7 with a corresponding stop face of 6. A member 11 corresponding to member *q* is carried by each part 7.

The operation of this last described modification will be apparent if the result of forcing a pipe 12 over the free end of the mandrel 1 is considered. If a pipe of circular section is used with the machine shown, the end will force members 7 inwardly as shown at the bottom of Fig. 6 so that the pipe section is free to slide upwardly over the mandrel. If rollers 3 are used, the pipe section, as it passes therebeneath, will be corrugated. Of course, if it is desired to retain the circular cross-section, the rollers may be removed or eliminated.

After the trailing end of the pipe section clears members 11, parts 7 will return to normal position as shown at the top of Fig. 6. Upon removal of the pipe, it will be crimped as previously described in connection with the modification of Fig. 1, parts 6 and 7 acting effectively as an integral finger.

In Fig. 7 there is indicated, at 13, a pipe of circular cross-section having a crimped end 14. It may be noted that a large number of crimping fingers are preferably employed to prevent bulging of intermediate parts of the pipe end.

It will be understood that the crimping device in accordance with my invention may be combined with any desired forming devices for the production of finished leader pipe by a continuous operation, or that the device may be used alone, and it will be understood that the device is adaptable, with obvious modification, to the crimping of leader pipe of various cross-sectional shapes and with or without fluting or corrugation.

What I claim and desire to protect by Letters Patent is:

1. Mechanism for crimping pipe, comprising a mandrel, and crimping means adjacent said mandrel for crimping the ends of pipes moving along and guided by the mandrel, said crimping means comprising a plurality of fingers engageable by the ends of pipes and movable upon such engagement inwardly towards the axis of the mandrel against the ends of pipes.

2. Mechanism for crimping pipe, which includes in combination a frame, blocks adjustably secured to the frame, a plurality of fingers pivotally carried by said blocks, means tending to normally retain said fingers in a retracted position and members extending from said fingers and adapted to be engaged by the end of a pipe whereby on advance of the pipe said fingers will be moved through an arc to effect crimping of the end portion of said pipe and to permit the passage of the body of the pipe.

3. Mechanism for crimping pipe, comprising a mandrel having a surface for guiding a pipe for longitudinal movement, and means adjacent an end of the guiding surface operative to crimp the end only of a pipe as it moves from said surface over the said end thereof, said means comprising a plurality of fingers arranged to swing inwardly against the end of the pipe to effect crimping.

4. Mechanism for crimping pipe, comprising a mandrel having a surface for guiding a pipe for longitudinal movement, and means adjacent an end of the guiding surface operative to crimp the end only of a pipe as it moves from said surface over the said end thereof, said means comprising a plurality of fingers arranged to swing inwardly against the end of the pipe to effect crimping, said mandrel being tapered to accommodate inward movement of the end of the pipe under the action of the fingers.

5. Mechanism for crimping pipe, comprising a stationary mandrel having a surface for guiding a pipe for longitudinal movement, and means adjacent an end of the guiding surface operative to crimp the end only of a pipe as it moves from said surface over the said end thereof, said means comprising a plurality of radially adjustable fingers arranged to swing inwardly against the end of the pipe to effect crimping.

6. Mechanism for crimping pipe, comprising a mandrel having a surface for guiding a pipe for longitudinal movement, and means adjacent an end of the guiding surface operative to crimp the end of a pipe as it moves from said surface over the said end thereof, said means comprising a plurality of fingers arranged to swing inwardly against the end of the pipe to effect crimping and movable with the pipe to inoperative position to permit free movement of the portion of the pipe inwardly of the crimped end.

7. Mechanism for crimping pipe, comprising a mandrel having a surface for guiding a pipe for longitudinal movement, and means adjacent an end of the guiding surface operative to crimp the end of a pipe as it moves from said surface over the said end thereof, said means being rendered automatically operative by movement of the pipe to a predetermined position.

8. Mechanism for crimping pipe, comprising a mandrel having a surface for guiding a pipe for longitudinal movement, and means adjacent an end of the guiding surface operative to crimp the end of a pipe as it moves from said surface over the said end thereof, said means being rendered automatically operative by movement of the pipe to a predetermined position, and being rendered inoperative by movement of the pipe beyond the position.

9. Mechanism for crimping pipe, comprising means for guiding a pipe for longitudinal movement, and a plurality of crimping fingers, each finger being pivoted outside the path of movement of the pipe with its free end movable in the direction of movement of the pipe from one side to the other of a position normal to the pipe whereby during such movement said end forces a portion of the wall of the pipe inwardly.

10. Mechanism for crimping pipe, comprising means for guiding a pipe for longitudinal movement, and a plurality of crimping fingers, each finger being pivoted outside the path of movement of the pipe with its free end movable by engagement by the pipe in the direction of movement of the pipe from one side to the other of a position normal to the pipe whereby during such movement said end forces a portion of the wall of the pipe inwardly.

11. Mechanism for crimping pipe including a plurality of fingers pivoted at their outer ends and normally yieldingly held with their free ends extending inwardly towards each other and forwardly, whereby the end of a pipe moving rearwardly therebetween may engage the inner free ends of the fingers and move them rearwardly about their pivots with the result that during such movement their free ends move further inwardly to crimp the pipe.

In testimony of which invention, I have hereunto set my hand, at Philadelphia, Pennsylvania, on this 23rd day of February, 1928.

AUGUST D. KUMPF.